(12) United States Patent
Higuchi et al.

(10) Patent No.: US 7,686,679 B2
(45) Date of Patent: Mar. 30, 2010

(54) CARCASS PROCESSING APPARATUS AND METHOD

(75) Inventors: Kiyoshi Higuchi, Moriya (JP); Kazushige Kitamura, Moriya (JP); Ryushiro Gatamura, Ichikikushinoki (JP); Masamichi Asou, Jousou (JP); Katsumi Fujima, Tsukuba (JP); Satoshi Tsuji, Funabashi (JP); Hidenori Ishizaki, Uozu (JP); Ryoichi Sagae, Adachi-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 0 days.

(21) Appl. No.: 12/056,170

(22) Filed: Mar. 26, 2008

(65) Prior Publication Data

US 2008/0233853 A1 Sep. 25, 2008

Related U.S. Application Data

(63) Continuation of application No. PCT/JP2006/317611, filed on Sep. 6, 2006, and a continuation of application No. PCT/JP2005/017582, filed on Sep. 26, 2005.

(51) Int. Cl.
*A22C 9/00* (2006.01)

(52) U.S. Cl. ..................................... 452/141

(58) Field of Classification Search .......... 452/141–145
See application file for complete search history.

(56) References Cited

U.S. PATENT DOCUMENTS

| 4,675,947 A | 6/1987 | Clatfelter et al. |
| 4,860,403 A | 8/1989 | Webb et al. |
| 5,512,014 A * | 4/1996 | Burnett ..................... 452/141 |
| 5,888,132 A * | 3/1999 | Burnett ..................... 452/141 |
| 5,899,802 A * | 5/1999 | Burnett ..................... 452/141 |
| 6,364,759 B2 * | 4/2002 | Allen et al. .............. 452/141 |
| 6,912,434 B2 * | 6/2005 | van den Nieuwelaar et al. ..................... 700/116 |
| 7,025,669 B2 * | 4/2006 | Richards .................. 452/141 |
| 7,249,998 B2 * | 7/2007 | van Esbroeck et al. ........ 452/58 |

FOREIGN PATENT DOCUMENTS

| JP | 4-7659 B2 | 2/1992 |
| JP | 8-9875 A | 1/1996 |
| JP | 11-345724 A | 12/1999 |
| JP | 2001-258467 A | 9/2001 |
| JP | 2002-198237 A | 7/2002 |

OTHER PUBLICATIONS

International search report issued in corresponding PCT/JP2006/317611, dated Dec. 12, 2006.

* cited by examiner

*Primary Examiner*—Thomas Price
(74) *Attorney, Agent, or Firm*—Rossi, Kimms & McDowell LLP

(57) ABSTRACT

To shorten a long aging time required for meat processing and reducing the viable cell count of a carcass before being cooked, an electric stimulus is imparted by applying an AC voltage via from electrode needles to at least the neck and legs of the meat carcass. The AC voltage is turned on for a time Ton and then turned off for a time Toff, and the application of the voltage is repeated a predetermined number of cycles. The Ton period is not longer than the Toff period, although the first Ton period can be longer than the Toff period. The voltage is not higher than 100V, and the frequency is not higher than the commercial frequency (maximum, 60 Hz). The aging effect is improved by stimulating the entire meat carcass electrically from at most three points.

20 Claims, 14 Drawing Sheets

Applied voltage waveform during Ton time interval

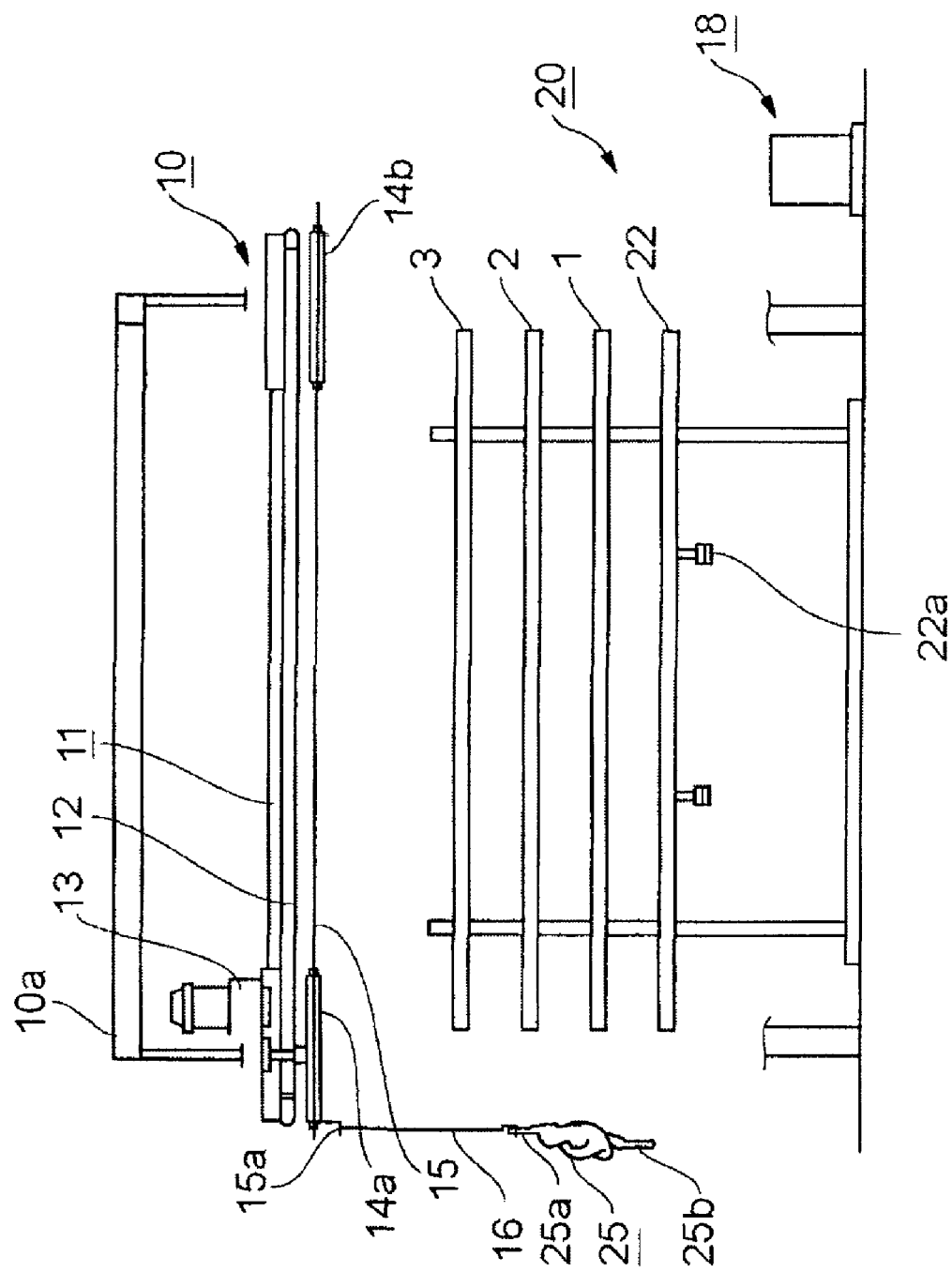

Travelling direction

FIG. 15

|  | Electrically stimulated meat | Measuring method |
|---|---|---|
| Hardness | Shear strength was lower by about 30 % than conventional processed meat. | Test piece of meat was cut out from meat heated for prescribed time period, and shear strength was measured. |
| Water retentivity | Water retentivity after cooling was higher by about 10 % than conventional processed meat. | Dripped water amounts was measured after cooling. |
| Flavor | Amounts of inosinic acid was larger by about 10 % than conventional processed meat. | Amounts of nucleic acid related substance was measured using high-performance liquid chromatography. |

CARCASS PROCESSING APPARATUS AND METHOD

This is a continuation of both International Application PCT/JP 2005/017582 having an international filing date of 26 Sep. 2005 and International Application PCT/JP2006/317611 having an international filing date of 6 Sep. 2006, which claims priority to PCT/JP 2005/017582. The disclosures of both International applications, in their entirety, including the drawings, claims, and the specifications thereof, are incorporated herein by reference.

BACKGROUND

Conventionally, it is typical to stun poultry with an electrical shock, then thereafter bleed, scald, defeather, eviscerate, cool, and age at low temperatures for extended periods. In the conventional method, the carcass is usually scolded to make the removal of feathers easier. Next, the carcass is defeathered, and then eviscerated. As there is a fear that the carcass becomes deteriorated during succeeding elongated processing scheme, its temperature at this point is reduced to about 4.4° C., typically by chilling the carcass in an ice or cold water bath. The chilled carcass is then aged at this low temperature for an extended period, for example, on the order of about 4 to 12 hours, to provide the required degree of tenderness and organoleptic quality.

After the low temperature aging process, the carcass is drained and cooked. However, the time required to age the carcass from the evisceration to cooking is about 4 hours to half a day in the case of poultry carcass, and 7 to 10 days or more in the case of large carcasses, such as those of pigs and cows. Such an extended aging period may cause a great problem from the hygiene and operation viewpoint.

According to the method for processing poultry disclosed in U.S. Pat. No. 4,675,947, a live poultry bird is slaughtered without applying electrical energy, the resulting carcass is scalded, then the carcass is held in a warm, humid atmosphere at a temperature approximately equal to the normal temperature of the live bird before defeathering, and then the carcass is eviscerated. During while the carcass is held in the warm, humid atmosphere, intermittent electrical stimulation is applied to the carcass for a period sufficient to render the poultry meat tender upon subsequent cooking without the need for an extended, low temperature aging period. This method eliminates the low temperature aging, which requires an extended period, and a solution containing phosphate salts and sodium chloride is introduced to the carcass or component parts thereof to further improve tenderness.

However, it is ideal to evade deposition of phosphate salts and sodium chloride in natural food. Thus, there remains a need to greatly reduce the time period required for the aging of carcasses in comparison with conventional processing apparatuses and methods. There also remains a need to reduce viable cell count on the carcasses before cooking.

SUMMARY OF THE INVENTION

The present invention relates to carcass processing apparatus and method, in particular, for shortening the time required to aging carcasses and sterilizing the carcasses, and more specifically to shortening of the aging time by applying current from before rigor mortis sets in but during while the rigor mortis is occurring to reduce viable cell count.

One aspect of the present invention is a carcass processing apparatus. The apparatus includes a carcass transfer device for transferring eviscerated carcass in a state before vigor mortis sets in but during while the vigor mortis is occurring, and a voltage applying device for applying electrical stimulation to a carcass transferred in the state before vigor mortis sets in but during while the vigor mortis is occurring. The voltage is alternating voltage and the electrical stimulation includes a plurality of periods of voltage applications and periods between the voltage applications. Each of the period of the voltage applications, the period between the voltage applications, the period from a first voltage application set-in to a last voltage application cutoff, and amplitude and frequency of the alternating voltage, are adjustable.

The voltage applying device can include an inverter with an electric power source to supply alternating voltage of 100V or lower. Alternatively, the voltage applying device supplies electric power of commercial frequency reduced in voltage to 100V or lower. The voltage applying device can supply alternating voltage of a frequency lower than that of commercial electric power. The period of voltage application can be shorter than the period between the voltage applications.

The voltage applying device includes electrode needles configured to stick through the skin of the carcass and apply electrical stimulation to the carcass. The voltage applying device can include a primary feeder wire configured to supply high-frequency current and a magnetic core with a secondary winding that is movable along the primary feeder wire without contacting the primary feeder wire. The secondary winding produces voltage when the magnetic core with the secondary winding moves along the primary feeder wire without contacting the primary feeder wire, to provide noncontact transmission of electric power.

The magnetic core can have a recess or groove. The primary feeder wire can have a plurality of spaced waveform shapes that extend in a horizontal plane such that when the magnetic core with the secondary winding is moved horizontally, part of the waveform shaped primary feeder wire is received in the recess or groove to induce voltage in the secondary winding by the high-frequency current passing through the primary feeder wire, while the primary feeder wire outside the recess or groove does not induce voltage in the secondary winding.

A plurality of carcass transfer devices can be provided. The transfer devices can be moved along an endless route. The apparatus can further include a carcass engaging section, a needle-sticking and wing-holddown section, a voltage applying section, and a carcass discharging section provided along the endless route. The primary feeder wire need only be provided in the voltage applying section.

The apparatus can further include a guide shaft fixed to the transfer device. The voltage applying device can be attached to the transfer device. The voltage applying device can include a carcass hanger having electrode needles configured to stick into the feet or leg of the carcass, and a slider having electrode needles configured to stick into the breast part of the carcass. The slider can be vertically movably supported relative to the transfer device and guided by the guide shaft. The slider is movable up to allow the electrode needles of the slider to stick into the carcass until tips of the electrode needles reach a hollow of the carcass produced by evisceration of the carcass. The slider is movable down so that the tips of electrode needles is between the bottom of the hollow and a lower end of the carcass before voltage is applied to the carcass via the electrode needles of the carcass hanger and the slider.

The slider can include a ball plunger comprising a ball and a spring for biasing the ball. The guide shaft can be provided with a groove for receiving the ball such that the ball engages the groove to restrict the movement of the slider at a height position with which the tips of electrode needles is between the bottom of the hollow and the lower end of the carcass.

Another aspect of the present invention is a method of processing a carcass. The method can include the steps of eviscerating the carcass, applying a first electrical stimulation to the carcass in a state before vigor mortis sets in but during while the vigor mortis is occurring, chilling the carcass to lower the temperature thereof, and applying a second electrical stimulation to the carcass following the chilling step. The first and second electrical stimulations include a plurality of periods of voltage applications and a period between the voltage applications, the voltage being alternating voltage. Each period of the voltage applications, the period between the voltage applications, the period from a first voltage application set-in to a last voltage application cutoff, and amplitude and frequency of the alternating voltage, are adjustable.

At least one of the first or second electrical stimulation applying step includes a first sub step of applying electrically stimulating voltage for a first time interval, a second substep of waiting for a second time interval, in which no voltage is applied, after the first time interval ends, and a third substep of repeating the first and second substeps. The first time interval is shorter than the second time interval.

Alternatively, at least one of the first or second electrical stimulation applying step includes a first substep of applying electrically stimulating voltage for a first time interval, a second substep of waiting for a second time interval, in which no voltage is applied, after the first time interval ends, a third substep of applying electrically stimulating voltage for a third time interval, a fourth substep of waiting for the second time interval, in which no voltage is applied, after the third time interval ends, and a fifth substep of repeating the third and fourth substeps. The first time interval can be longer than the second time interval and the third time interval. The second time interval is longer than the third time interval.

At least one of the first or second electrical stimulation applying step includes a sixth substep of applying electrically stimulating voltage for a fourth time interval, a seventh substep of waiting for a fifth time interval, in which no voltage is applied, after the fourth time interval ends, and an eighth substep of repeating the sixth and seventh substeps. The fourth time interval is shorter than the fifth time interval.

BRIEF DESCRIPTION OF THE DRAWINGS

FIG. 3 is a front view of an embodiment of the carcass processing apparatus.

FIG. 15 is a table showing results of improvement in meat quality according to the invention.

DETAILED DESCRIPTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
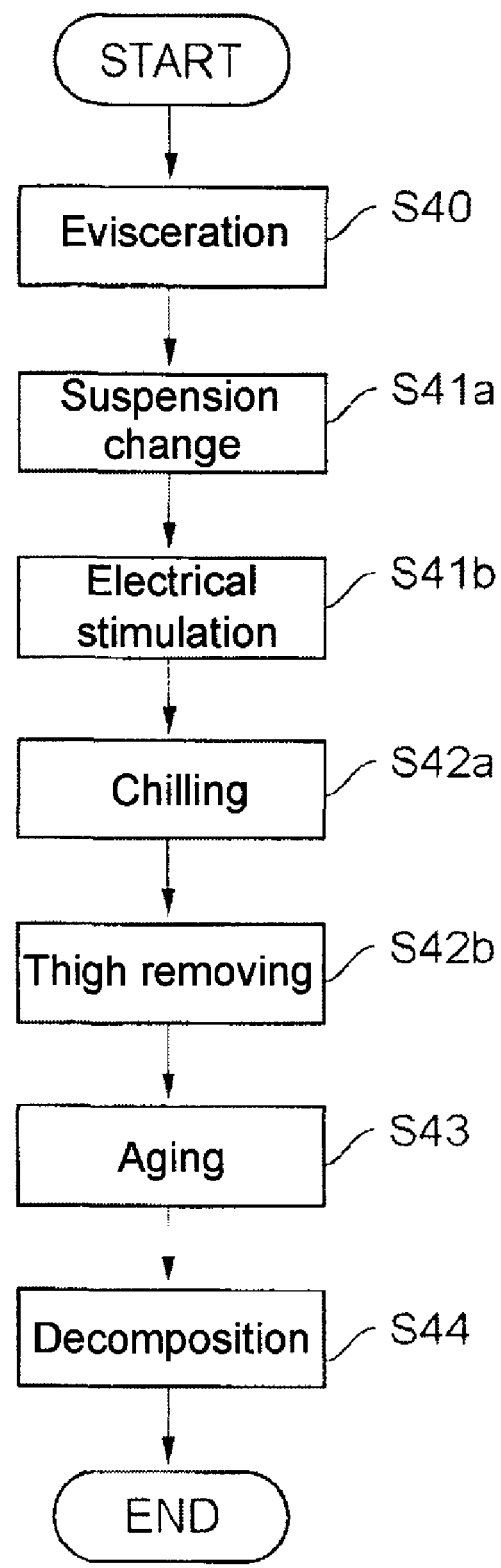
FIG. 1 is a flowchart of a conventional carcass processing.

Before explaining the various embodiments according to the present invention, a conventional carcass processing will be explained in reference to FIG. 1, which shows a flowchart of a conventional carcass processing. According to the conventional carcass processing, the carcass, after being stunned with an electrical shock, bled, scalded, and defeathered, is eviscerated at an evisceration step S40. The eviscerated carcass is suspended in a transfer conveyor line at a suspension transition step S41a in a state before rigor mortis sets-in but during while the rigor mortis is occurring. Then, at an electrical stimulation applying step S41b, viable bacteria count adhered to the carcass is reduced by applying electrical stimulation for a few minutes, which stimulation promotes biochemical change in the muscle tissue of the carcass. Then, at a chilling step S42a, the carcass reduced in viable cell count is subjected to low temperature processing. Then, at a thigh removing step S42b, the thighs of the carcass is removed. Then, at an aging step S43, the carcass is aged in an aging room. The time required to age the carcass is about 4 hours to a half day. Lastly, at a dissection step S44, the carcass is dissected and breast meat is obtained.

According to a first carcass processing method according to the present invention, the conventional processing step mentioned above in FIG. 1 can be used, but the voltage waveform is changed in the electrical stimulation applying step S41b, by which the time required to age the carcass is shortened to about 2 hours (from about 4 hours to a half day of the conventional processing method) while attaining the same result as that of the conventional method. The first carcass processing method includes a transfer step of transferring the carcass subjected to the evisceration step S40, which carcass is in a state before rigor mortis sets-in but during while the rigor mortis is occurring, and a stimulation applying step of applying electrically stimulating voltage having a plurality of voltage apply cycles of different duration applied to the carcass in a state before rigor mortis sets-in but during while the rigor mortis is occurring with a voltage applying device via carcass holding members by ON-OFF operation of the voltage apply device. The electrical stimulation is applied by ON-OFF operation of alternating voltage with durations of 'ON' and 'OFF.' The period from the first 'ON' to the end of the last 'ON,' and the value of voltage and its frequency are determined and varied to optimize the effect of the electrical stimulation. Specifically, an alternating voltage of 100V or lower can be applied at a frequency lower than the commercial frequency (maximum 60 Hz), with the 'ON' duration shorter than the 'OFF' duration.

Figure 2A:
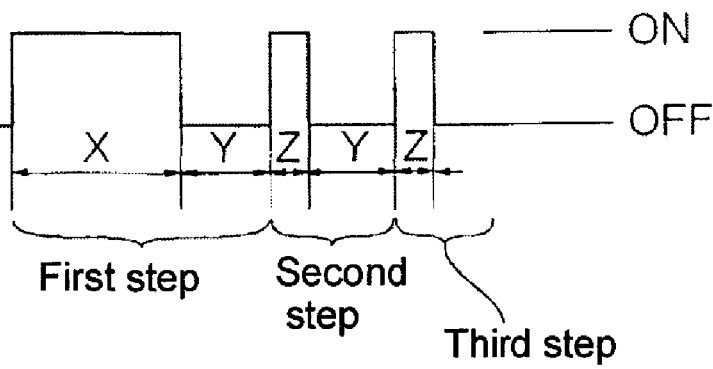
FIGS. 2A and 2B are examples of voltage apply cycle for applying electrical stimulation to the carcass.

FIG. 2A is an example of voltage applying cycle at the electrical stimulation applying step S41b. The electrically stimulating voltage applying operation includes a first step, a second step, and a third step. The first step of applying electrically stimulating voltage continues for a time interval of X followed by an interruption of voltage application for a time interval of Y. Then, in the subsequent second step, application of electrically stimulating voltage continues for a time interval of Z followed by an interruption of voltage application for a time interval of Y. In the third step, the electrically stimulating voltage application and the interruption thereof being the same as in the second step are repeated. The feature of this electrically stimulating voltage application mode is that the voltage application duration X is longer than that of Y and Z.

Figure 2B:
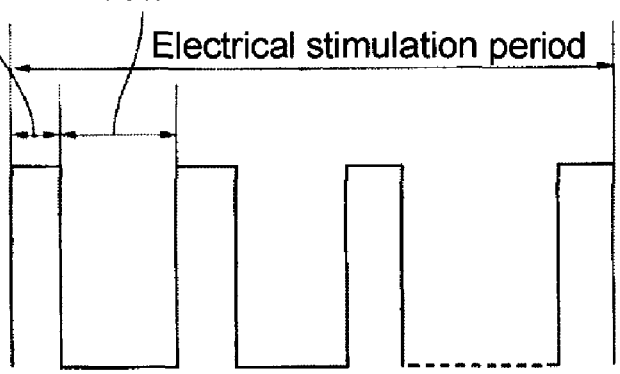
Figure 2C:
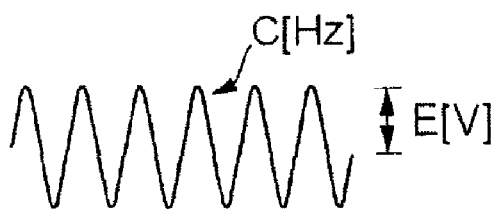
FIG. 2C is an example of voltage waveform.

FIG. 2B is another example of voltage applying cycle. Here, a time interval Ton of the electrically stimulating voltage application and a time interval Toff of the interruption thereof are different from each other. This ON-OFF operation is repeated. The electrically stimulating voltage application period means a time period from the first voltage 'ON' to the last voltage 'OFF', as shown in FIG. 2B. FIG. 2C is an example of the voltage waveform applied during the time interval Ton in FIG. 2A or FIG. 2B. In this embodiment, Ton, Toff, alternating voltage (100V or lower), and alternating frequency (commercial frequency or lower, maximum 60 Hz), can be determined and varied to optimize the effect of the electrical stimulation.

According to a second carcass processing method according to the present invention, a second electrical stimulation applying step is further provided after the chilling step (low temperature cooling step) S42a before the thigh removing step S42b. That is, this method includes the evisceration step, the first electrical stimulation applying step (such as in the first method) of applying electrical shock to the carcass in a state before rigor mortis sets-in but during while the rigor mortis is occurring, a low temperature chilling step, and a second electrical stimulation applying step (similar to the first electrical stimulation applying step) of applying electrical shock to the carcass following the chilling step. The mode of electrically stimulating voltage application in each of the electrical stimulation applying steps can be determined and varied to optimize the effect of the electrical stimulation.

FIG. 3 is a front view of a first embodiment of the carcass processing apparatus according to the present invention that can be used to carry out the methods described above. The apparatus includes a transfer conveyor 10, a voltage applying section 20, and an electrical control section 18. The transfer conveyor 10 includes a transfer mechanism 11, which includes a frame work 10a, a horizontally circular guide rail 12 located in the upper part of the frame work 10a, a transfer chain 15 for transferring a plurality of roller carriers (not shown in FIG. 3) attached thereto to be guided by the guide rail 12, a drive sprocket wheel 14a, a driven sprocket wheel 14b, and a driving geared motor 13, and a plurality of shackles 16 each for clamping the feet 25a of the carcass 25, the shackles being attached detachably to each of hooks 15a attached to the transfer chain 15.

Figure 4:
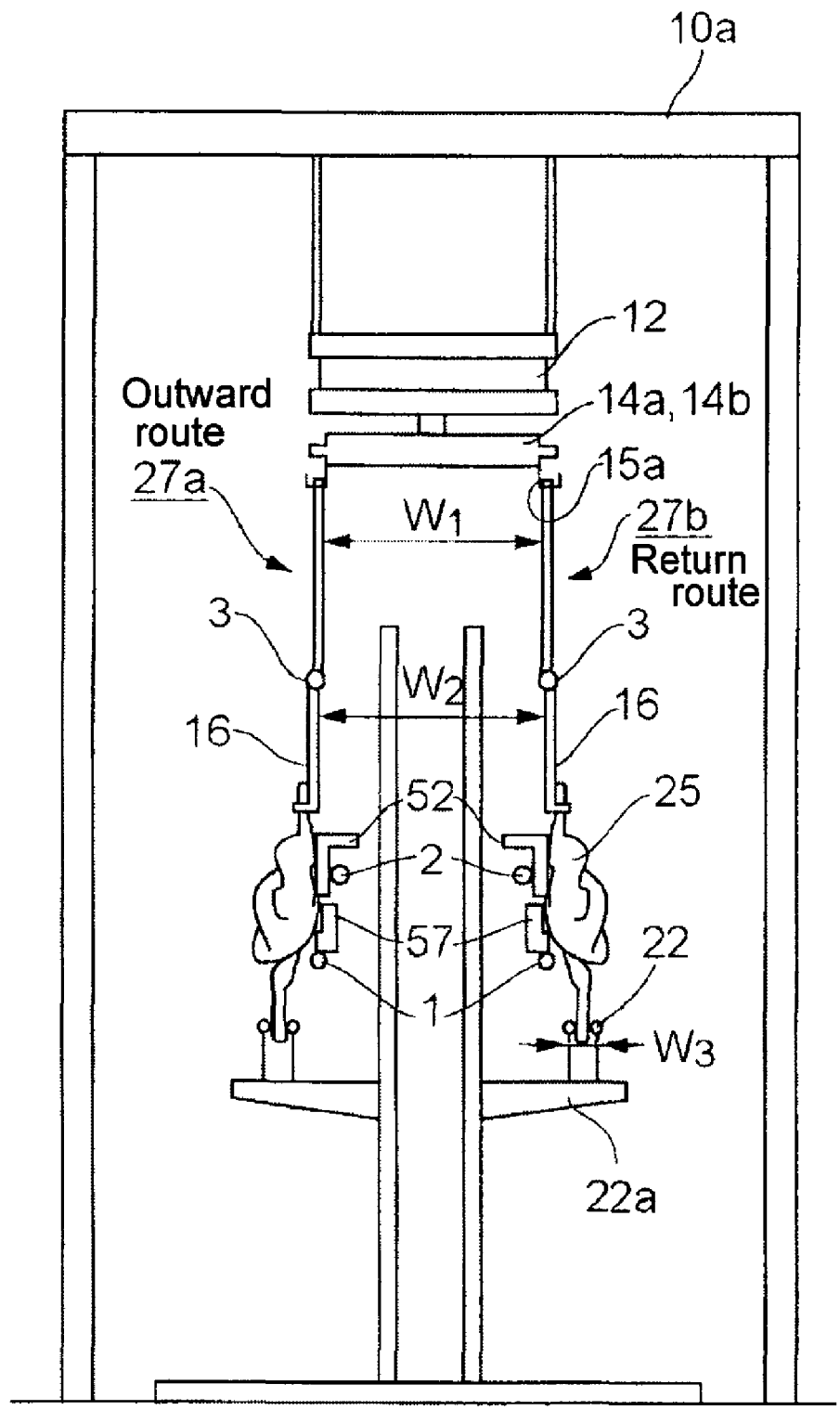
FIG. 4 is a right-side elevational view of the carcass processing apparatus of FIG. 3.

FIG. 4 is a right-side elevation of the carcass processing apparatus of FIG. 3. The transfer conveyor 10 constitutes a round route of an outward route 27a and a return route 27b via the transfer chain 15 looped over the drive sprocket 14a and driven sprocket 14b in the upper center part of the frame work 10a. The voltage applying section below the transfer conveyor 10 includes electrode rails 1, 2, 3 and grounding electrodes 22, each of which is located right below the outward route 27a and return route 27b respectively. Each of the grounding electrodes 22 includes two electric wires running parallel to each other and supported on a grounding electrode supporter 22a. Alternating voltage of 100V or lower is supplied to the electrode rails 1, 2, and 3 from a commercial electric source or a variable frequency electric source of an inverter. In this case, in the voltage waveform shown in FIG. 2C uses frequency C that is a commercial frequency or lower (maximum 60 Hz), and voltage E is 100V or lower.

The electrode rails 3 just below the outward route 27a and return route 27b are located such that width W2 between the electrode rails 3 is a little wider than width W1 between the hooks 15a attached to the endless chain 15 so that when the carcass 25 is hanging from the hook 15a with its feet held in the shackle 16 while the shaft part of the shackle 16 contacts the electrode rail 3 positively with a contact pressure. The grounding electrode 22 is supported on the grounding electrode support 22a such that width W3 between the two electric wire of the grounding electrode is a little smaller than the diameter of the neck 25b of the carcass 25 so that the electric wires can pinch the neck 25b when the feet 25a of the carcass 25 are held in and the carcass 25 hanging from the shackle 16. Thus, electrically stimulating voltage can be applied to the carcass 25 without fail via the electrode rail 3, the shackle 16, the feet 25a of the carcass 25, the neck 25b of the carcass 25, and the grounding electrode 22.

Figure 5:
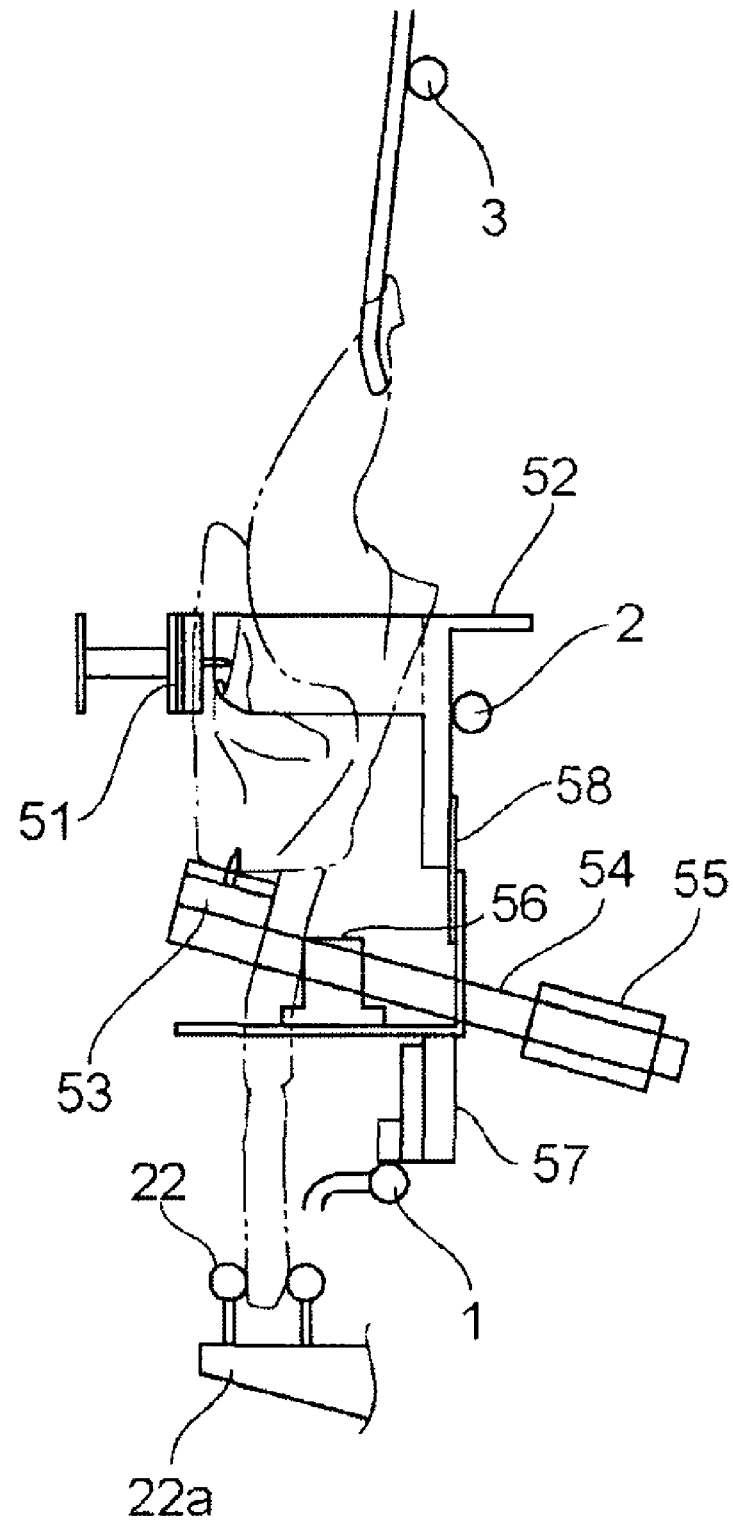
FIG. 5 is a side elevational view showing a state the carcass is electrically stimulated in the apparatus of FIG. 3.

FIG. 5 is a side elevation viewed from the outward route 27a showing a state in which the carcass 25 is electrically stimulated. A needle 51 for sticking the breast of the carcass 25 is supported by a metal supporter 52. The metal supporter 52 is pushed to contact the electrode rail 2 positively, with the pressure pushed by the carcass when the carcass is stuck with the electrode needle 51, toward the electrode rail 2. Predetermined stimulating voltage is applied to the carcass 25 via the electrode rail 2. A needle 53 for sticking the root part of the neck 25b is attached to an end part of a metal bar 54 that is swingably supported by a bearing 56, which is supported by a metal supporter 57. By moving down a grip 55 provided at other end part of the metal bar 54, the electrode needle 53 sticks into the carcass and the metal supporter 57 contacts the electrode rail 1 positively with a pressure. Predetermined stimulating voltage is applied to the carcass 25 via the electrode rail 1. The metal supporters 52 and 57 are connected with an insulating plate 58. Each mode of electrically stimulating voltage applied to each of the electrode rails 1, 2, and 3 is determined to optimize the effect of the electrical stimulation.

When performing electrical stimulation, usually the transfer conveyor 10 is stopped in a state where a plurality of carcasses are hanging from the conveyor, and ON-OFF of voltage application is controlled by the electrical control section 18. With the present apparartus, electrically stimulating operation of large number of carcasses is made possible, and the apparatus can be effectively utilized to compose an automatic processing line.

Figure 6:
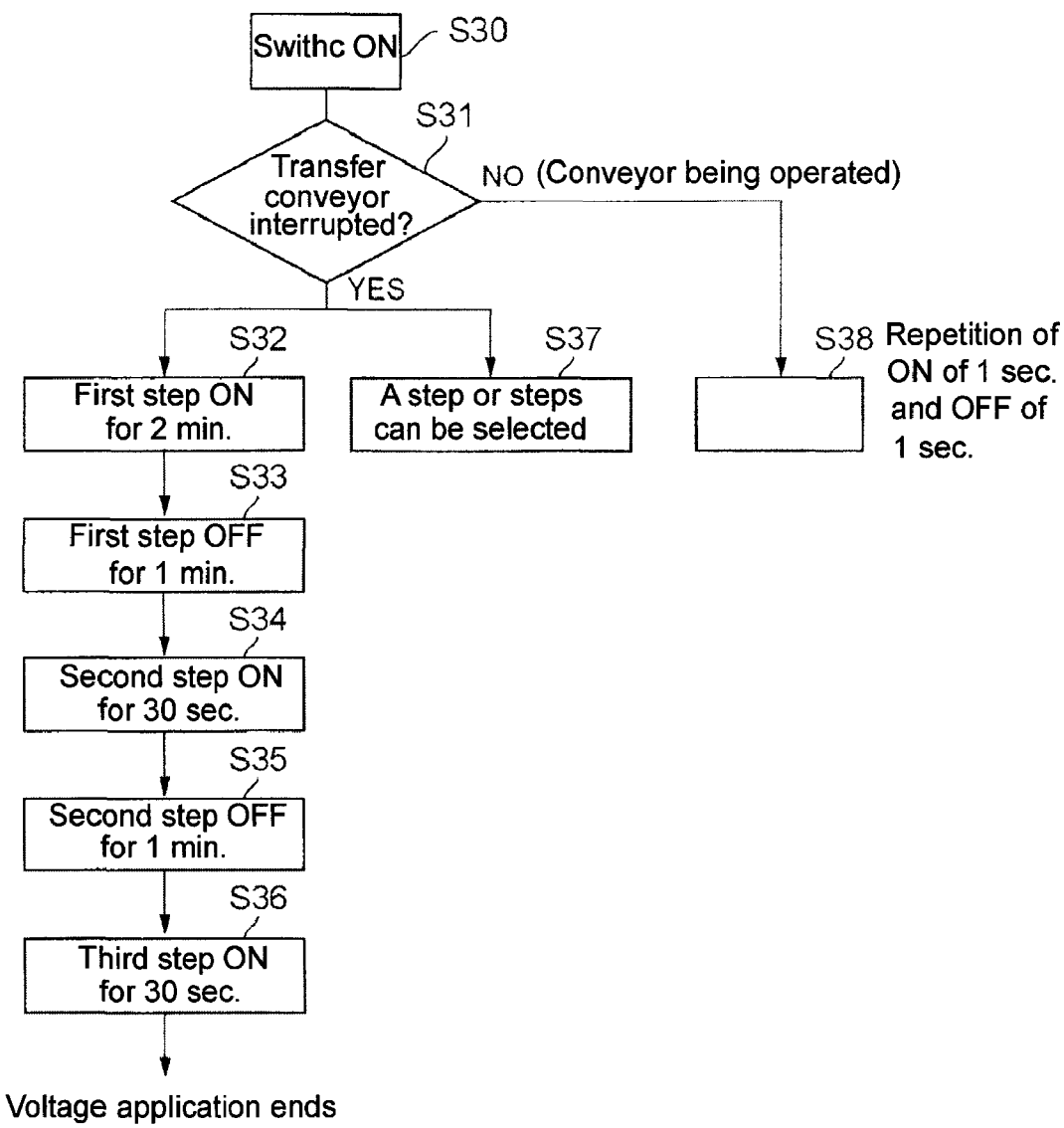
FIG. 6 is an operation flowchart of the carcass processing apparatus.

FIG. 6 is an operation flowchart of the carcass processing apparatus. The operation process will be explained using a stimulation voltage application mode shown in FIG. 2A as an example. First, the power source is switched on at step S30. Then whether operation of the transfer conveyor 10 is interrupted or not is judged at step S31. When the transfer conveyor 10 is being interrupted, the voltage application of the first step through the third step shown in FIG. 2A is performed as shown in FIG. 6 from step S32 through step S36 to end the voltage application, or as shown by a step 37 in FIG. 6, a step or steps is selected from among the first to third steps of FIG. 2A, and voltage application is performed for a desired period for the selected step or steps. When the transfer conveyor 10 is operating, a cycle of application of voltage of 100V, 50 Hz for 1 second and interruption for succeeding 1 second, for example, is repeated while the transfer conveyor is operating. This repetition of cycle can be started with a start button (e.g., switch) and stopped with a stop button (e.g., switch). The transfer conveyor 10 is operated continuously at normal speed of 1.52 m/min., for example, by switching ON with the start button and switching OFF with the stop button. The electric control section 18 is provided with a section to set electrically stimulating voltage application mode and controls voltage applying in accordance with the determined mode.

Figure 8:
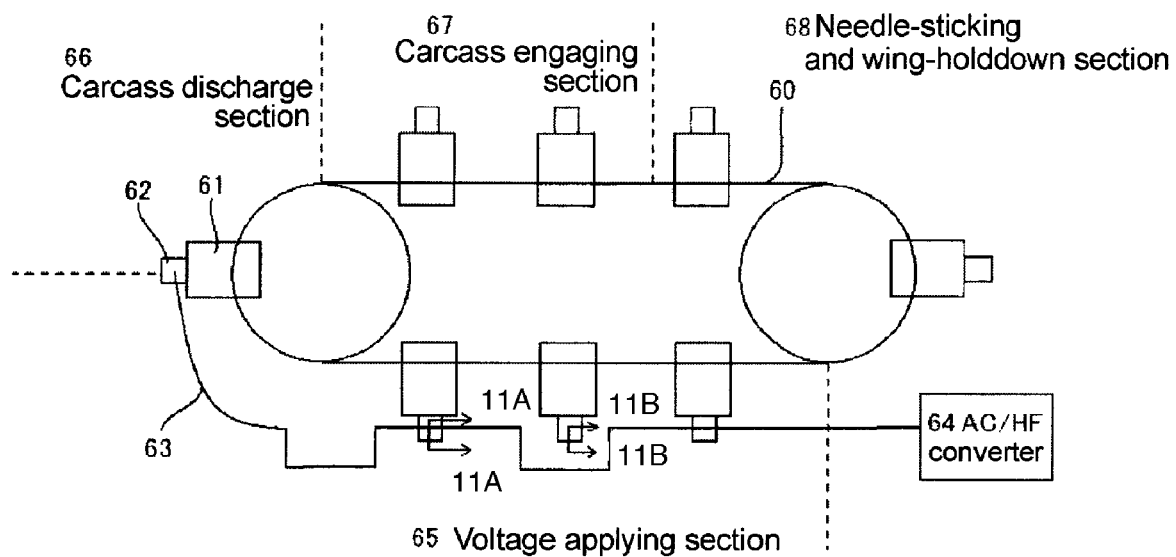
FIG. 8 is a plan view of another embodiment of the processing apparatus.

Referring to FIGS. 8-13, a second embodiment of the processing apparatus according to the present invention will be explained. Referring to FIG. 8, which is a plan view of the second embodiment of the processing apparatus, a plurality of carcass transferring bodies 61 are provided to be transferred along a transfer rail 60 forming a circulation route. There are provided along the circulating route of the transfer rail 60 a carcass engaging section 67 where the carcass is engaged to the carcass transferring bodies 61, a needle-sticking and wing-holddown section 68 where needles for applying voltage to the carcass are stuck into the carcass, a voltage applying section 65 where electrically stimulating voltage is applied to the carcass, and a carcass discharge section 66 where the carcass that has been electrically stimulated is discharged.

Each of the carcass transferring bodies 61 is provided with a pick-up coil 62 includes a magnetic core and a secondary winding. In the voltage applying section 65, alternating current of commercial frequency is converted to high-frequency alternating current by an AC/HF converter 64 attached to the carcass carrier 61, and the high-frequency current is conducted to a primary feeder wire (hereafter referred to as litz wire) 63. By the passage of the high-frequency current through the litz wire 63, voltage is induced in the secondary winding of the magnetic core of the pick-up coil 62, and electric power is transmitted from the litz wire 63 to the pick-up coil 62 without contacting with each other.

Figure 9:
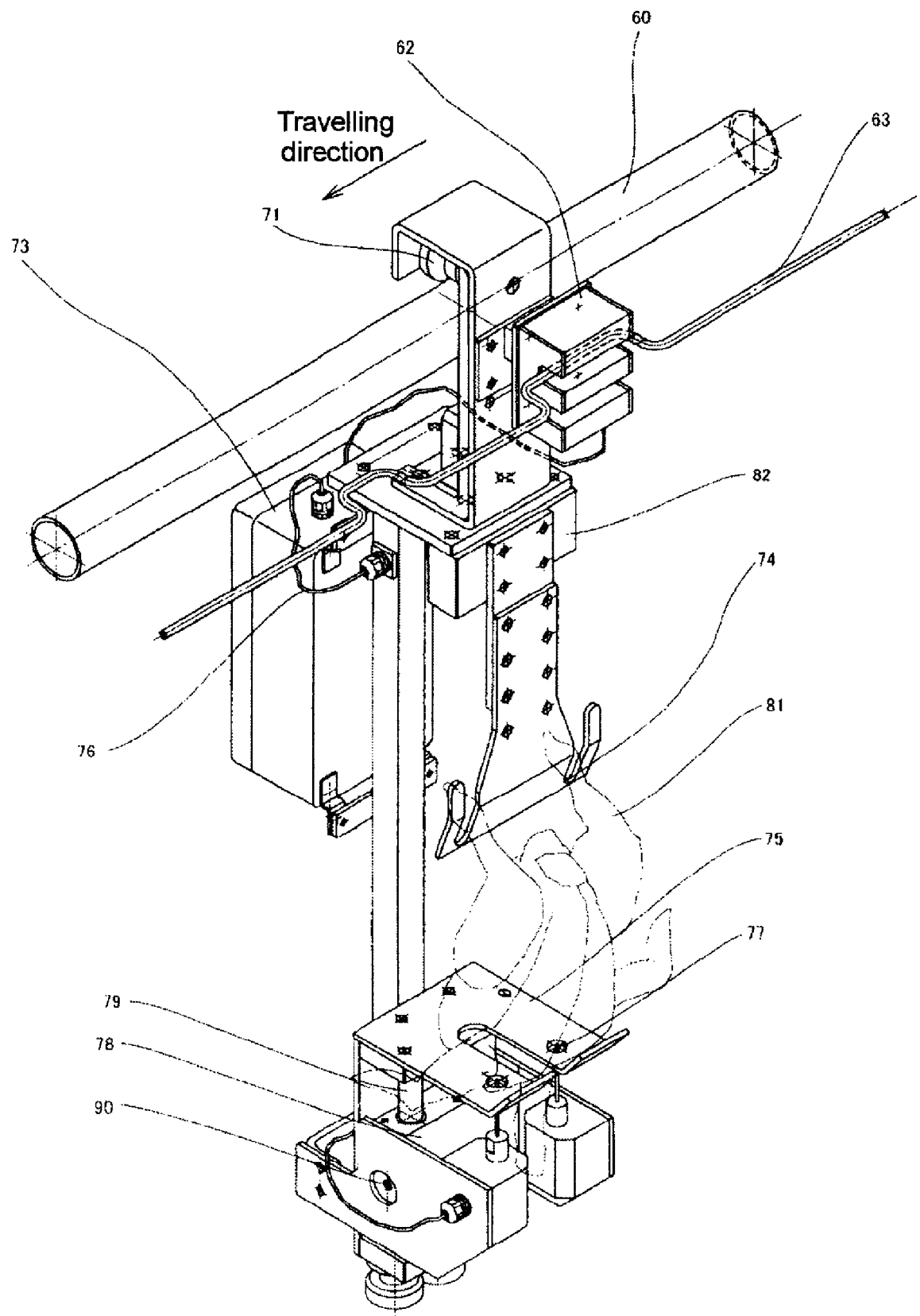
FIG. 9 is a perspective view of the carcass carrier of the apparatus of FIG. 8.

The litz wire 63 is formed into a shape of so-called alternating rectangular wave as shown in FIG. 9 and supported by a litz wire supporter provided to a side wall. When a part of the litz wire passes through the airspace of the pick-up coil 62, stimulation voltage application is 'ON', i.e., the passage time interval is Ton, and when a part of the litz wire passes outside of the airspace of the pick-up coil 62, stimulation voltage application is 'OFF', i.e., the passage time interval is Toff. The wave shape of the litz wire can be determined arbitrary as desired. Since Ton and Toff can be switched by the wave shape of the litz wire 63, the litz wire can be always energized so that the switching of power source becomes unnecessary. Thus, continuous energizing (not batch control) of energizing of the litz wire is allowed, resulting in efficient energizing control. Further, the litz wire 63 does not exists in the carcass discharge section 66 and carcass engaging section 67, where manual work is needed, safety is secured for workers in the discharge section 66 and engaging section 67.

Figure 10:
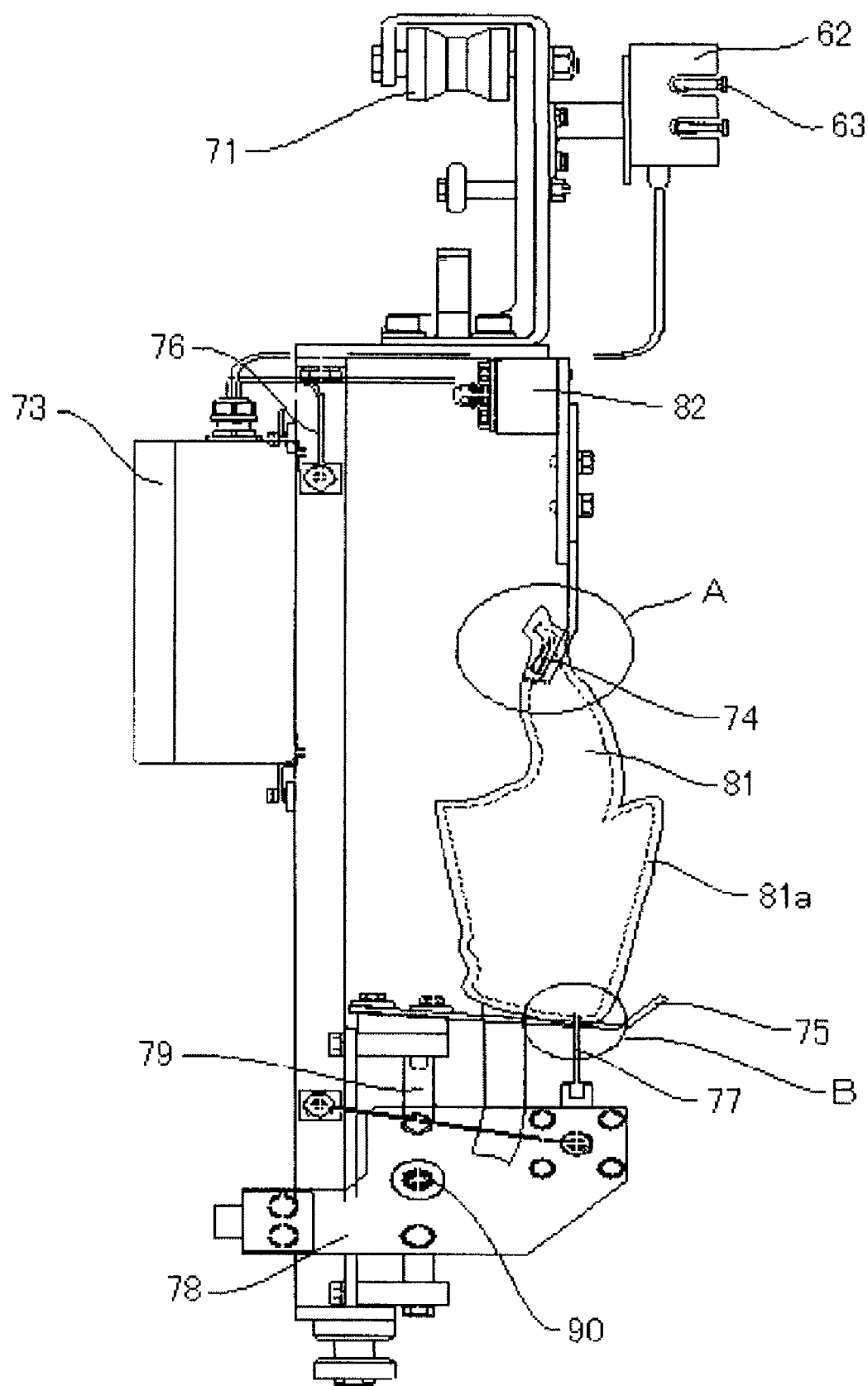
FIG. 10 is a side elevation of the carcass carrier of the apparatus of FIG. 8.

Referring to FIGS. 9 and 10, which show perspective and side elevation views of the carcass carrier 61, the carcass carrier 61 has a wheel 71 that engages the transfer rail 60 so that the carcass carrier 61 can move along the transfer rail 60. The high-frequency current conducted from the litz wire 63 through noncontact transmission of electric power to a HF/AC converter 73 is converted to alternating voltage by the converter 73, and distributed to electrode needles 74 and electrode needles 77 via an electric wire 76 and frame elements and a carcass hanger of the carcass carrier 61 to apply electrical stimulation to the carcass 81. The carcass 81 is stuck at its feet or legs with the electrode needles 74 provided at an end of the carcass hanger to be fixed thereto so that the carcass hangs from the carcass hanger with its breast part supported on a shoulder support plate 75. A slider 78 moves up by a shaft 79 to allow the electrode needles 77 provided with the slider 88 to stick into the breast part of the carcass 81. This way, the electrode needles 74, 77 are stuck into the carcass, penetrating the skin 81a of the carcass as can be seen in the areas indicated by circles A and B of FIG. 10. Electrical stimulation can be applied at low voltage to the carcass via the electrode needles 74 and 77.

Figure 11A:
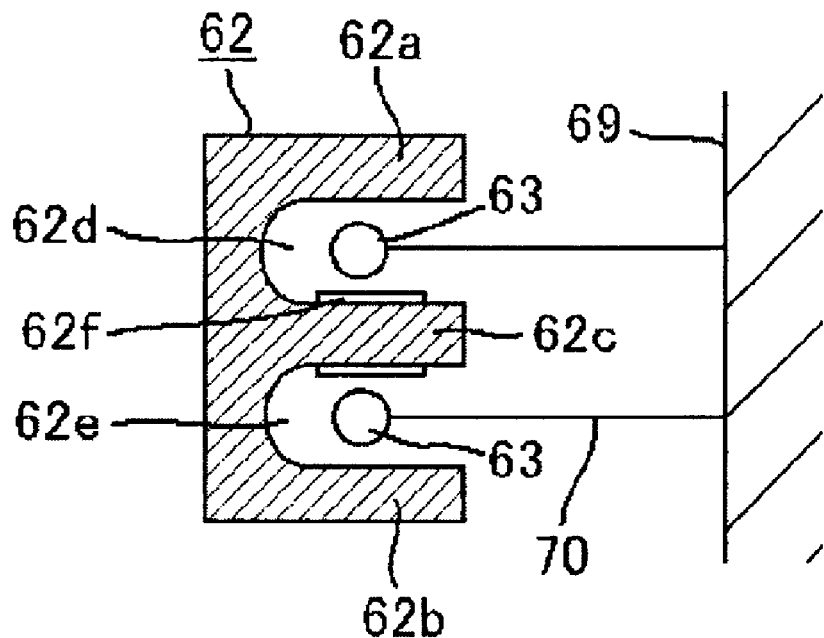
FIGS. 11A and 11B are respectively a section view along the line 11A-11A and 11B-11B of FIG. 8.
Figure 11B:
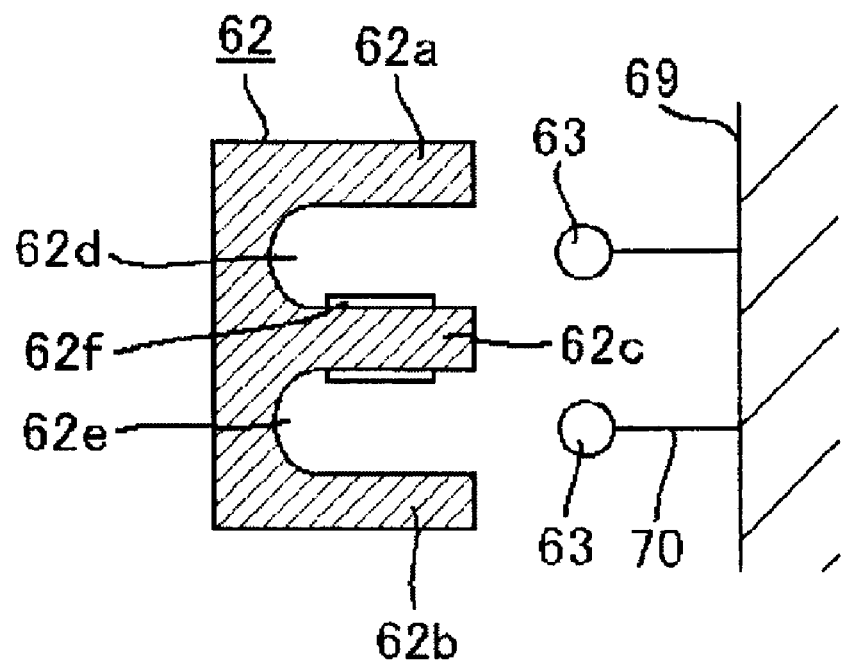

FIGS. 11A and 11B are respectively a section view along the line 11A-11A and 11B-11B of FIG. 8. As shown in FIG. 11A, the pick-up coil 62 is shaped to have the general shape of a letter E in its cross section, i.e., to have a pair of outer magnetic cores 62a, 62b and a central magnetic core 62c so that a pair of airspace 62d, 62e are formed between the outer cores 62a, 62b and central core 62c. The litz wires 63 are supported by litz wire supporters 70 fixed to a side wall 69 respectively such that, when the pick-up coil 62 fixed to the carcass carrier 61 travels along the transfer rail 60, a part of each litz wire 63 is received in each of the airspaces 62d and 62e without contacting the walls of the airspaces. When high-frequency alternating current is fed to the litz wires 63, a magnetic field of time varying direction of field line and field intensity is generated in the pick-up core 62, and voltage is induced in the secondary windings 62f when a part of the litz wire 63 is in the airspace 62d or 62e of the pick-up coil 62 as shown in FIG. 11A. When the litz wire 63 is not in the airspace 62d or 62e of the pick-up coil 62 as shown in FIG. 11B, a magnetic field in the pick-up core 62 is not generated even if the high-frequency is passing through the litz wire 63; the litz wire 63 and the pick-up coil 62 are electrically interrupted.

Figure 12:
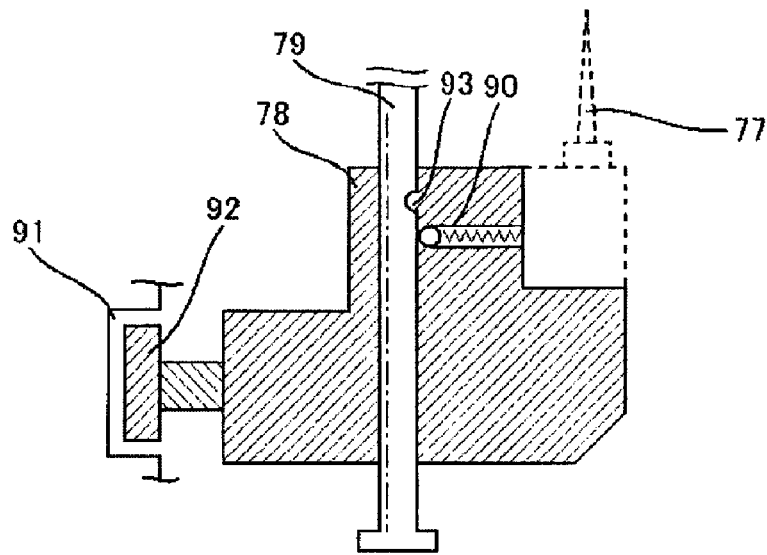
FIG. 12 is a section view of the slider.

FIG. 12 is a section view of the slider 78. The slider 78 can be moved up and down along the shaft 79. The vertical position of the slider 78, when the electrode needles 77 provided to the slider 78 sticks into the breast part of the carcass 81, can be determined by the engagement of a ball of a plunger 90 including the ball and the spring, with a groove 93 provided to the shaft 79. The slider 78 is movable up and down by guiding a guide member 92 attached to the slider 78 along a guide groove 91 in which the guide member 92 is received, as explained hereunder referring to FIG. 13.

Figure 13:
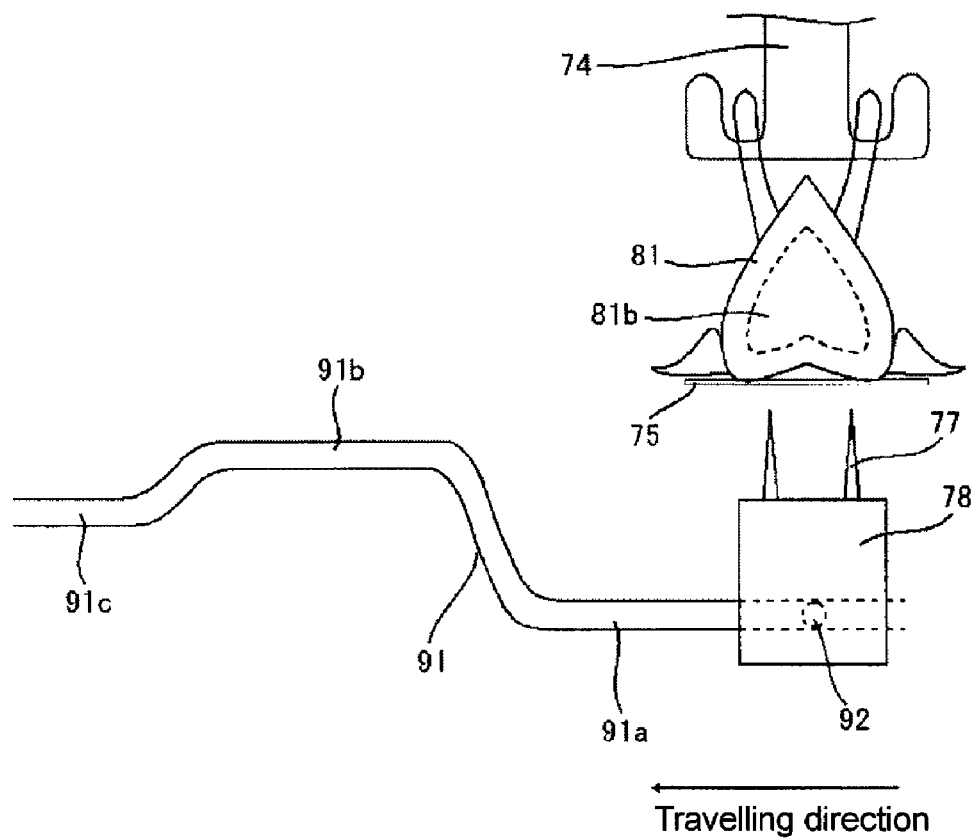
FIG. 13 is a schematic representation showing the mechanism of sticking/withdrawing the carcass with electrode needles by shifting the slider provided with the needles in the needle-sticking and wing-holddown section.

FIG. 13 is a schematic representation showing the mechanism of sticking/withdrawing the carcass with the electrode needles 77 by the vertically shifting of the slider by guiding the slider via the guide groove 91 in the needle-sticking and wing-holddown section 68. The carcass 81 is hooked at its feet to the electrode needles 74 of the carcass hanger of the carcass carrier 61, so that the carcass becomes fixed to the carcass hanger with its breast part supported on the shoulder support plate 75 of the carcass carrier 61 in the carcass engaging section 67. The carcass carrier 61 is transferred along the transfer rail 60 to the needle-sticking and wing-holddown section 68.

In the needle-sticking and wing-holddown section 68, the guide member 92 of the slider 78 provided with the electrode needles 77 enters the guide groove 91. The guide groove 91 is formed to have a lowest groove 91a continuing to a highest groove 91b, which continues to an intermediate height groove 91c running in a height position between the highest groove 91b and lowest groove 91a as can be seen in FIG. 13. When the guide member 92 attached to the carcass carrier 61 travels along the lowest groove 91a, the tips of the electrode needles 77 are below the carcass 81. When the guide member 92 moves up along the guide groove 91 toward the highest groove 91b as the carcass carrier 61 travels along the transfer rail 60, the electrode needles 77 stick into the carcass penetrating the skin 81a of the carcass 81. When the guide member reaches the highest groove 91b, the tips of the electrode needles 77 has run into the hollow 81b produced by the evisceration of the carcass 81. The electrode needles 77 moves down as the guide member 91 moves down toward the intermediate height groove 91c as the carcass carrier 61 travels. When the guide member 92 is traveling in the intermediate height groove 91c, the tips of the electrode needles 77 is between the bottom of the hollow 81b and lower extremity of the carcass 81.

By allowing the electrode needles 77 to penetrate the carcass 81 until the tips of the electrode needles 77 run into the hollow 81b of the eviscerated carcass 81 and then to be drawn back until the tips are between the bottom of the hollow 81b and lower end of the carcass in this way, the electrode needles 77 can be stuck into the carcass 81 through the flabby skin 81a of the carcass positively. By allowing the electrode needles to penetrate the skin 81a of the carcass 81, electrical stimulation can be applied to the carcass 81 at low voltage.

By forming the guide groove 91 such that the height position of the slider 78 when the guide member 92 is in the intermediate height groove 91c coincides with the height position of the slider 78 when the ball of the ball plunger 90 engages with the groove 93 of the shaft 79, the slider 78 can be retained at the height position with which the electrode needles 77 attached to the slider 78 is stuck into the carcass 81, so it is enough to provide the guide groove 91 in the needle-sticking and wing-holddown section 68, and the guide groove 91 need not be provided in the voltage applying section 65.

Aging effect by electrical stimulation is different depending on the voltage, frequency, and cycle pattern of applied voltage. Effects of aging was compared by changing voltage, frequency, and cycle pattern for stimulating at frequencies lower than 60 Hz and voltages equal to or lower than 100V. A cycle pattern shown in FIG. 2B was used with Ton different from Toff. In some examples, Ton was set equal to Toff.

A first setting (100V, 60 Hz, 2 minutes of electrical stimulation period) was compared with a second setting (20V, 60 Hz, 2 min. of electrical stimulation period). With the first setting, scorching, and discoloration occurred on the test piece. With the second setting of 20V, scorching and discoloration were scarcely observed. The aging effect was irrelevant to the voltage (i.e., no correlation between the aging effect and these voltages) and almost the same in the two cases. Consequently, a lower stimulating voltage is preferred.

Then, a third setting (20V, 5 Hz, 1 second of Ton, 2 seconds of Toff, 3 minutes of stimulation period) was compared with a fourth setting (20V, 60 Hz, 1 second of Ton, 2 seconds of Toff, 3 minutes of stimulation period). The aging effect was better with the third setting. Consequently, a lower frequency is preferred.

Further, the third setting (20V, 5 Hz, 1 second of Ton, 2 seconds of Toff, 3 minutes of stimulation period) was compared with a fifth setting (20V, 5 Hz, 1 second of Ton, 1 second of Toff, 3 minutes of stimulation period). The aging effect was better with the third setting. Consequently, it is preferred to set the Toff period longer than the Ton period. A longer Toff period, one that provides a sufficient time for relaxation of the muscle of the test piece, improves the aging effect.

Figure 7:
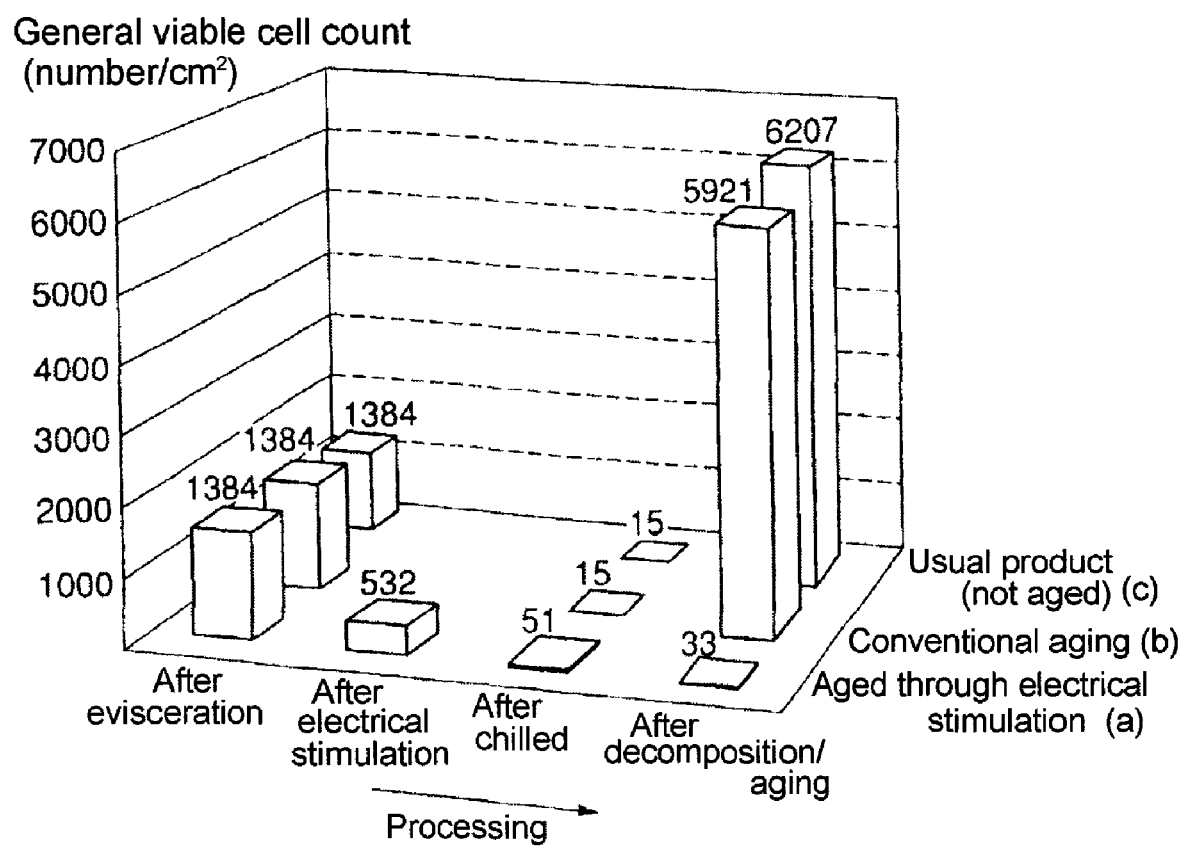
FIG. 7 is a histogram showing aging effect of the carcass processed with the conventional method.

FIG. 7 is a histogram showing the aging effect (general viable cell count) of the carcass processed with a conventional method. Breast meat was subjected to the following aging operations:

(a): electrical stimulation aging (electrical stimulation +2 hours aging, breast meat of cock and hen mixed), the test breast meat was subjected to electrical stimulation of 100V, 50 Hz was applied for 5 minutes.

(b): usual aging (conventional 4 hours low temperature aging), the test breast meat was aged for 4 hours in a aging room of 2° C. after passing through a chiller.

(c): usual article (not aged, breast meat of cock and hen mixed), processed in a conventional processing line.

From FIG. 7, it is recognized that in the case of process (a), general viable cell count is reduced conspicuously with aging hours reduced by 2 hours. According to the test result of example mentioned above, it is proved that the aging effect can be further improved. Further, the test result of the example also showed that the meat quality was improved as follows. Decomposition of ATP (adenosine triphosphate) by enzyme is promoted by applying electrical stimulation to the carcass after vigor mortis sets in. Therefore, the quality of meat after deboning can be improved by applying electrical stimulation to the carcass, i.e., the maximum value of inosininic acid, which is nucleic acid related substance, and a flavor-enhancing ingredient can be rapidly produced.

Figure 14:
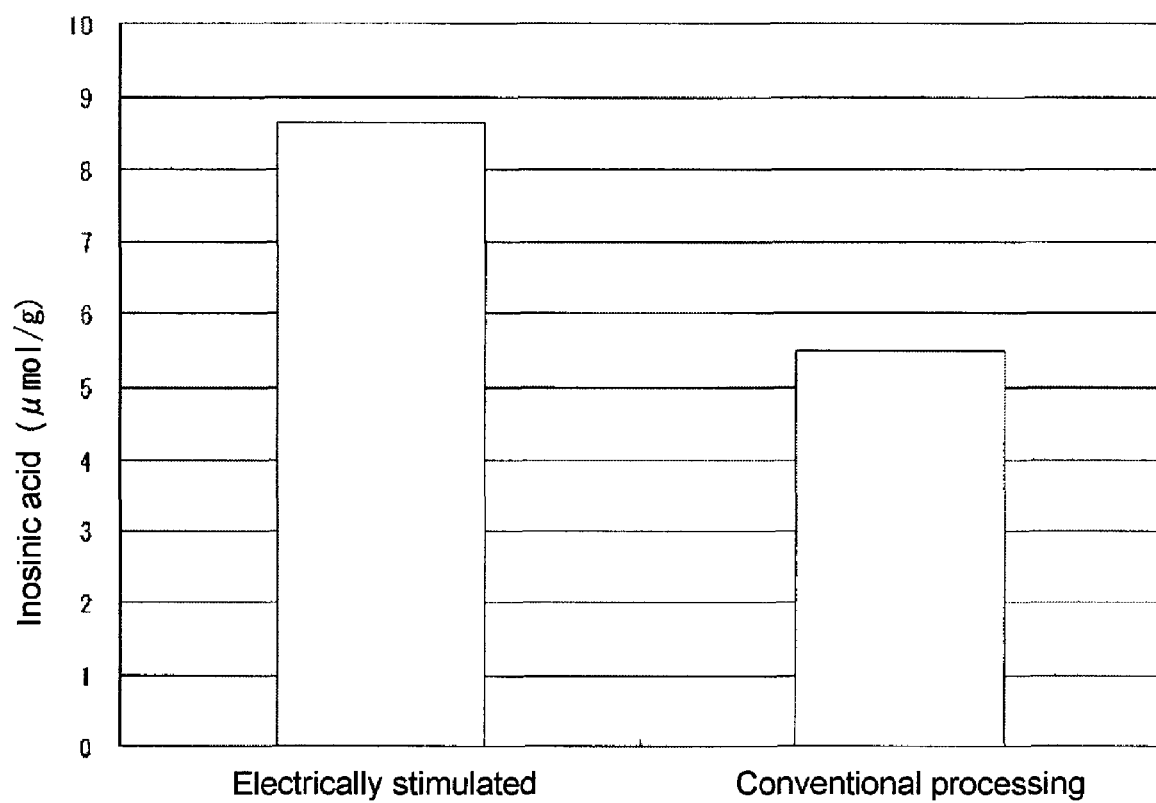
FIG. 14 is a graph comparing the amount of inosinic acid in the carcass after the carcass is applied with electrical stimulation and then deboned according to the present invention and that according to the conventional method.

FIG. 14 is a graph comparing the amount of inosinic acid in the carcass after the carcass is applied with electrical stimulation and then deboned according to the present disclosure and that in the case of reference example of the conventional method. The content of inosinic acid was 8.6 µmol/g in the test example according to the present invention, whereas 5.4 µmol/g in the case of the reference example of conventional processing.

Further, tenderizing and increase in water absorbing property of the tissue can be achieved by applying electrical stimulation to the carcass after vigor mortis sets in. Raw flesh is subjected to physical treating such as massaging, tumbling, and tenderizing when seasoning and soaking to allow pickling liquor to soak into the meat and obtain processed meat products. By utilizing the effect of electrical stimulation, the ionic mass increased in permeability by electrical stimulation soaks its way into the muscle fiber and increases the water holding property, so that such physical treatment can be omitted. Meat products processed by the method as mentioned above will have high meat juice retentivity when cooled, thus reducing the cooking loss. Further, by applying electrical stimulation to the carcass after rigor mortis sets in and refrigerating the carcass in a state chemical and physical properties are retained, a delicious taste is improved and productive efficiency can be increased while keeping the quality of the meat from the hygienic standpoint.

The improvement in meat quantity concerning water holding property, flavor, and hardness of the meat was measured, and the result is illustrated in FIG. 15 together with measuring method as follows:

Hardness: Shear strength of a piece of meat cut in a prescribed shape after heated for a prescribed time period was measured. Shear strength of the meat subjected to electrical stimulation according to the invention was lower by about 30% than that of usual meat, which means that the meat processed according to the invention was tender than usual meat.

Water holding property: Dripped water amount was measured. Water retention of the meat subjected to electrical stimulation according to the invention was higher by about 10% than that of conventionally treated meat.

Flavor or delicious taste: Amounts of nucleic acid related substance was measured using high-performance liquid chromatography. Amounts of inosinic acid, one of nucleic acid related substance, was larger in the meat subjected to electrical stimulation according to the invention than in the conventionally treated meat.

Further, when deboning the carcass after electrical stimulation is applied, elongated aging time of the carcass in a chilled state in the conventional processing causes the muscle fiber and the connective tissue in muscle to become fragile, and fine splits of meat remain on the bone when performing mechanical deboning. Consequently, the yield of meat is reduced and the external appearance is deteriorated. According to the present processing according to the present invention, since deboning can be performed without delay after the application of electrical stimulation, the yields of meat increases in comparison with the conventional method.

The present invention is applicable to a poultry carcass processing apparatus and method, and also applicable to the processing of carcasses livestock including pigs, cows, and so on.

The present invention can reduce the aging time period required in the conventional carcass processing. Further, viable cell count adhered to carcasses before cooking can be reduced. Specifically, the processing time periods can be reduced by the reduction in aging time periods, which contributes significantly to control microbe growth. By applying the present invention, labor-saving automated process can be instituted, first-in first-out system and stable temperature control can be realized by composing a continuous processing apparatus.

While the present invention has been particularly shown and described with reference to preferred embodiments thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

What is claimed is:

1. A carcass processing apparatus comprising:
a carcass transfer device for transferring eviscerated carcass in a state before vigor mortis sets in but during while the vigor mortis is occurring; and
a voltage applying device for applying electrical stimulation to a carcass transferred in the state before vigor mortis sets in but during while the vigor mortis is occurring,
wherein the voltage is alternating voltage and the electrical stimulation includes a plurality of periods of voltage applications and a period between the voltage applications, and
wherein each period of the voltage applications, the period between the voltage applications, the period from a first voltage application set-in to a last voltage application cutoff, and amplitude and frequency of the alternating voltage, are adjustable.

2. The apparatus according to claim 1, wherein the voltage applying device includes an inverter with an electric power source to supply alternative voltage of 100V or lower.

3. The apparatus according to claim 1, wherein the voltage applying device supplies electric power of commercial frequency reduced in voltage to 100V or lower.

4. The apparatus according to claim 1, wherein the voltage applying device supplies alternating voltage of a frequency lower than that of commercial electric power.

5. The apparatus according to claim 1, wherein the period of voltage application is shorter than the period between the voltage applications.

6. The apparatus according to claim 1, wherein the voltage applying device includes electrode needles configured to stick through the skin of the carcass and apply electrical stimulation to the carcass.

7. The apparatus according to claim 1, wherein the voltage applying device includes a primary feeder wire configured to supply high-frequency current and a magnetic core with a secondary winding that is movable along the primary feeder wire without contacting the primary feeder wire, and wherein the secondary winding produces voltage when the magnetic core with the secondary winding moves along the primary feeder wire without contacting the primary feeder wire, to provide noncontact transmission of electric power.

8. The apparatus according to claim 7, wherein the magnetic core has a recess or groove, the primary feeder wire has a plurality of spaced waveform shapes that extend in a horizontal plane such that when the magnetic core with the secondary winding is moved horizontally, part of the waveform shaped primary feeder wire is received in the recess or groove to induce voltage in the secondary winding by the high-frequency current passing through the primary feeder wire, while the primary feeder wire outside the recess or groove does not induce voltage in the secondary winding.

9. The apparatus according to claim 7, further including a plurality of carcass transfer devices movable along an endless route, and a carcass engaging section, a needle-sticking and wing-holddown section, a voltage applying section, and a carcass discharging section provided along the endless route, wherein the primary feeder wire is provided only in the voltage applying section.

10. The apparatus according to claim 7, further including a plurality of carcass transfer devices movable along an endless route, and a carcass engaging section, a needle-sticking and wing-holddown section, a voltage applying section, and a carcass discharging section provided along the endless route, wherein the primary feeder wire is provided only in the voltage applying section.

11. The apparatus according to claim 1, further including a guide shaft fixed to the transfer device, wherein the voltage applying device is attached to the transfer device and the voltage applying device comprises:
a carcass hanger having electrode needles configured to stick into the feet or leg of the carcass; and
a slider having electrode needles configured to stick into the breast part of the carcass,
wherein the slider is vertically movably supported relative to the transfer device and guided by the guide shaft,
wherein the slider is movable up to allow the electrode needles of the slider to stick into the carcass until tips of the electrode needles reach a hollow of the carcass produced by evisceration of the carcass, and
wherein the slider is movable down so that the tips of electrode needles is between the bottom of the hollow and a lower end of the carcass before voltage is applied to the carcass via the electrode needles of the carcass hanger and the slider.

12. The apparatus according to claim 11, wherein the slider includes a ball plunger comprising a ball and a spring for biasing the ball, and the guide shaft is provided with a groove for receiving the ball such that the ball engages the groove to restrict the movement of the slider at a height position with which the tips of electrode needles is between the bottom of the hollow and the lower end of the carcass.

13. A method of processing a carcass comprising the steps of:
- eviscerating the carcass;
- applying a first electrical stimulation to the carcass in a state before vigor mortis sets in but during while the vigor mortis is occurring;
- chilling the carcass to lower the temperature thereof; and
- applying a second electrical stimulation to the carcass following the chilling step,
- wherein the first and second electrical stimulations include a plurality of periods of voltage applications and a period between the voltage applications, the voltage being alternating voltage, and
- wherein each period of the voltage applications, the period between the voltage applications, the period from a first voltage application set-in to a last voltage application cutoff, and amplitude and frequency of the alternating voltage, are adjustable.

14. The method according to claim 13, wherein at least one of the first or second electrical stimulation applying step includes:
- a first substep of applying electrically stimulating voltage for a first time interval;
- a second substep of waiting for a second time interval, in which no voltage is applied, after the first time interval ends;
- a third substep of applying electrically stimulating voltage for a third time interval;
- a fourth substep of waiting for the second time interval, in which no voltage is applied, after the third time interval ends;
- a fifth substep of repeating the third and fourth substeps.

15. The method according to claim 14, wherein the first time interval is longer than the second time interval and the third time interval.

16. The method according to claim 15, wherein the second time interval is longer than the third time interval.

17. The method according to claim 16, wherein at least one of the first or second electrical stimulation applying step includes:
- a sixth substep of applying electrically stimulating voltage for a fourth time interval;
- a seventh substep of waiting for a fifth time interval, in which no voltage is applied, after the fourth time interval ends; and
- an eighth substep of repeating the sixth and seventh substeps.

18. The method according to claim 17, wherein the fourth time interval is shorter than the fifth time interval.

19. The method according to claim 13, wherein at least one of the first or second electrical stimulation applying step includes:
- a first substep of applying electrically stimulating voltage for a first time interval;
- a second substep of waiting for a second time interval, in which no voltage is applied, after the first time interval ends; and
- a third substep of repeating the first and second substeps.

20. The method according to claim 19, wherein the first time interval is shorter than the second time interval.

* * * * *